2 Sheets—Sheet 1.
1315X
W. H. PEABODY.
ROTARY WINNOWER.
Patented June 8, 1810.
References
a Sectional part of Cylinder
b Arms of cylinder
c Shaft
d arms of shaft
e fingers
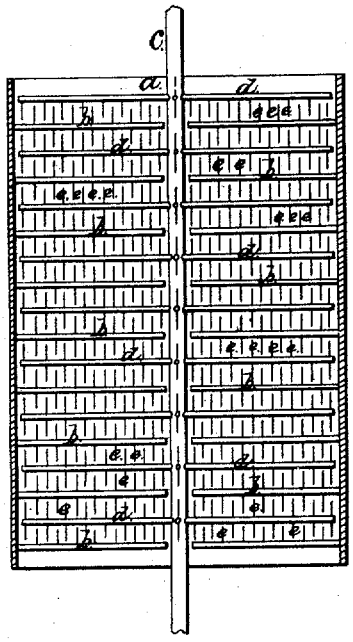
Patent Office July 9. 1839.
Made under the direction of the Commissioner of Patents, in conformity with Act: 3d March 1837
Henry L Ellsworth
Commissioner of Patents.
THE NORRIS PETERS CO., PHOTO-LITHO., WASHINGTON, D. C.

1315X
2 Sheets—Sheet 2
W. H. PEABODY.
ROTARY WINNOWER.
Patented June 8, 1810.
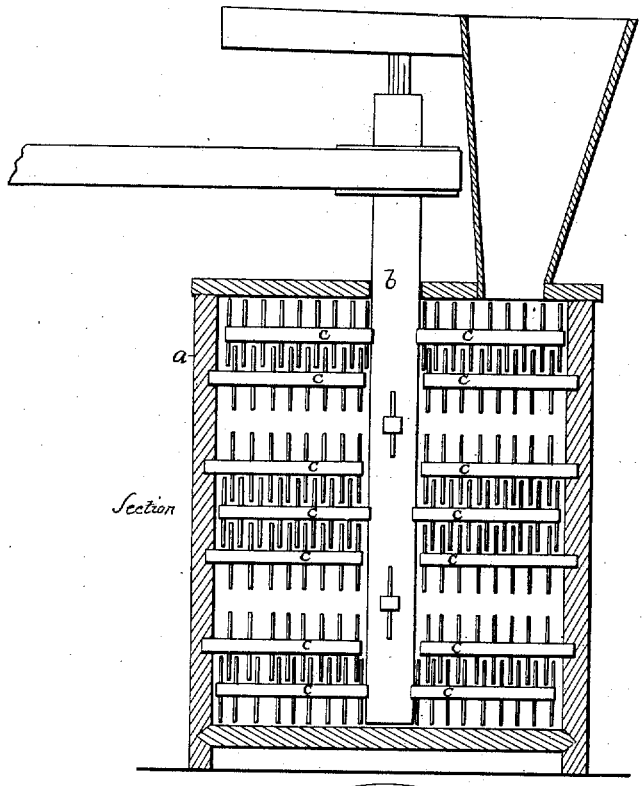
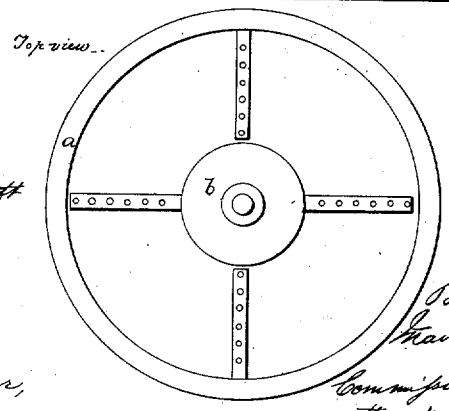
References
a. the barrel, b. shaft
c. arms & fingers
Correct
C. W. M. Keller,
Patent office Feb. 25th 1845.
Made under the direction of the Commissioner of Patents in conformity with act of 3d March 1837
Henry L. Ellsworth
Commissioner of Patents.
Myatt
THE NORRIS PETERS CO., PHOTO-LITHO., WASHINGTON, D. C.

William H. Peabody. 1315X

Letters Patent

The schedule referred to in these Letters Patent and making part of the same containing a description in the words of the said William H. Peabody himself of his machine for cleaning different sorts of Grain and Seeds.

---

A cylinder barrel to stand perpendicular and stationary, with a shaft standing perpendicular, and passing through the center of the same, with arms extending from the shaft in two or more opposite horizontal directions with fingers through said arms pointing perpendicularly upwards and downwards, with similar arms and fingers made fast to the inside of the barrel, and extending towards the shaft in four or more directions, the article wanted to be cleaned must be put into the top of the cylinder and pass down through the same. The shaft with its arms and fingers are to be turned with men, cattle or water, as shall be found most expedient, the barrel, shaft arms and fingers, are to be of such dimensions, and to come as nearly in contact when the shaft is in motion, as shall be found necessary, to produce the friction wanted to clean the different kinds of articles intended to operate upon.

Witnesses

Nathan Preston

Henry B. Peabody

William H. Peabody

[illegible]

Exd [illegible]